(12) United States Patent
Heinrich et al.

(10) Patent No.: US 7,249,665 B2
(45) Date of Patent: Jul. 31, 2007

(54) DOUBLE CLUTCH

(75) Inventors: Johannes Heinrich, Friedrichsdorf (DE); Hans Hauck, Schwäbisch Hall (DE); Karl-Heinz Bauer, Graben-Neudorf (DE)

(73) Assignee: BorgWarner Inc., Aurburn Hills, MI (US)

( * ) Notice: Subject to any disclaimer, the term of this patent is extended or adjusted under 35 U.S.C. 154(b) by 200 days.

(21) Appl. No.: 11/060,645

(22) Filed: Feb. 17, 2005

(65) Prior Publication Data
US 2005/0189195 A1 Sep. 1, 2005

(30) Foreign Application Priority Data
Feb. 27, 2004 (EP) .................. 04004484

(51) Int. Cl.
*F16D 25/10* (2006.01)
(52) U.S. Cl. ............... 192/87.11; 192/48.8; 192/85 AA
(58) Field of Classification Search ............. 192/87.11
See application file for complete search history.

(56) References Cited

U.S. PATENT DOCUMENTS

| | | | | | |
|---|---|---|---|---|---|
| 3,224,539 | A | * | 12/1965 | Hensel | ................. 192/86 |
| 4,237,749 | A | * | 12/1980 | Koivunen | ................. 475/281 |
| 4,964,504 | A | * | 10/1990 | Friedmann | ................. 192/48.4 |
| 4,966,270 | A | | 10/1990 | Rispeter et al. | |
| 5,662,198 | A | * | 9/1997 | Kojima et al. | ......... 192/87.11 |
| 5,865,289 | A | | 2/1999 | Ishimaru | |
| 6,454,074 | B1 | * | 9/2002 | Kundermann et al. | ... 192/87.11 |
| 2004/0206599 | A1 | | 10/2004 | Hegerath | |

* cited by examiner

*Primary Examiner*—Richard M. Lorence
(74) *Attorney, Agent, or Firm*—Fitch, Even, Tabin & Flannery; Greg Dziegielewski

(57) ABSTRACT

A double clutch for a transmission with two transmission input shafts is disclosed having two clutches which can rotate about a common rotational axis, are arranged one behind the other in the axial direction, and have a common driving outer plate support and which each have a driven inner plate support. A tension sleeve at least partially surrounds the outer plate support for selectively activating one of the two clutches.

22 Claims, 6 Drawing Sheets

DOUBLE CLUTCH

FIELD

The disclosure pertains to a double clutch for a transmission with two transmission input shafts with two clutches which can rotate about a common rotational axis and which have a common driving outer plate support and which each have a driven inner plate support, and, more particularly, to a double clutch having a tension sleeve which surrounds the outer plate support can be used to activate one of the two clutches.

BACKGROUND

Double clutches for motor vehicles are distinguished according to the type of their frictional partners as dry or wet, i.e., cooled by liquid coolant, clutches. Furthermore, double clutches can be distinguished according to their arrangement. For wet double clutches, there are configurations of clutches nested one in the other in the radial direction ("concentric arrangement") and clutches arranged one behind the other in the axial direction ("parallel arrangement").

Wet parallel clutches, in which the motor-side drive is realized via the inner plate support and the power take-off is realized via the outer plate support, are known. Such an embodiment follows, e.g., from EP1195537 B1. This configuration has the disadvantage that the driven-side flywheel masses are relatively large due to the large cylindrical outer plate support. This leads to disadvantages in the synchronization of the individual gears.

Furthermore, a configuration by means of power take-off via inner plate supports is also known. Examples of such double clutches follow from DE19833376 A1 or DE10146606 A1. However, in both embodiments, the hydraulic activation is complicated and expensive. In particular, DE19833376 A1 has a relatively complicated lever rod assembly with a plurality of tie rods for power transmission from annular pistons to the plate packet.

SUMMARY

A double clutch such as for a motor vehicle is disclosed, which is both easy to assemble and permits simplified synchronization of the motor vehicle gears. For a double clutch with two clutches, which can rotate about a common rotational axis, which are arranged one behind the other in the axial direction, and which have a common driving outer plate support and which each have a driven inner plate support, a tension sleeve is disclosed which can be used to activate one of the two clutches.

A double clutch may be in a parallel arrangement with driving outer plate supports instead of a complicated lever rod assembly with tie rod(s). A tension sleeve surrounding the outer plate support can be used to activate one of the two clutches. In this way, the advantages of the power take-off via the inner plate support with low moment of inertia are combined with simplified hydraulic activation.

The tension sleeve covers preferably, though not necessarily, the outer plate support over its entire axial length. Thus, it is possible to arrange the activation device for moving the tension sleeve within the outer contours of the tension sleeve in the radial direction to minimize the radial assembly space.

The tension sleeve can be embodied complementary to the outer contours of the outer plate support in terms of form and function, such as with a cylindrical shape. Sufficient axial stroke is provided to allow activation of the corresponding clutch. In this way, the necessary radial assembly space can be reduced to the minimum extent required for the functionality of the clutch.

The tension sleeve (like the outer plate support) can have openings leading outwards essentially in the radial direction to permit efficient cooling of the (friction) plates rubbing against each other. Fluid, e.g., coolant, guided correspondingly over the surfaces of the plates rubbing against each other, can be efficiently discharged outwards in the radial direction.

Furthermore, the tension sleeve is supported on the outer plate support so that it can move in the axial direction. Such a bearing can consist of one or more radial bearings, but it can also be one or more simple guide sleeves attached to the outer circumference of the outer plate carrier. Thus, on the one hand, a low-friction sliding of the corresponding surfaces of the tension sleeve and the outer plate support on each other can be achieved, and, on the other hand, the two components, tension sleeve and outer plate support, can be generally fixed in the radial direction. Both effects contribute to a tendency toward low wear and tear.

The tension sleeve can transfer tensile force for the activation of one clutch. Thus, an arrangement of the individual clutches of the double clutch is possible in which the single clutches operate a common back plate and the axial activation forces of the two clutches act inwards against each other, i.e., against the common back plate. An advantageous configuration of this variant has a tension sleeve cover, which is limited by a stop at least in the direction of the rotational axis, in order to bring the plates of one clutch into frictional engagement. A connection without rotational play or a rigid connection between the tension sleeve cover and tension sleeve is not necessary, although may be used. However, this embodiment with (one-sided or two-sided) axial activation has the advantage of simplified and thus economical production and also assembly.

It follows from the above configurations that the disclosed double clutch is suitable both for dry clutches and also for wet-running plate clutches. For activating one clutch, there is preferably a first activation piston that can be activated hydraulically by a first pressure chamber. This variant can be used when the clutch is a wet-running clutch, because then the already-provided hydraulic fluid required for the hydraulic activation is used as coolant for cooling the (friction) plates.

The active connection between the first activation piston and the tension sleeve for activating the clutch can be embodied similar to that between the tension sleeve and tension sleeve cover. Thus, the first activation piston can be limited by stops at least in one direction of the rotational axis, namely in the direction transmitting force for activating the clutch. However, two-sided fixing in the axial direction can also be provided. The activation piston and the tension sleeve are preferably connected to each other without rotational play or even rigidly, i.e., integrally. However, the multi-part, one-sided, stop-limited configuration can have advantages in terms of complexity of the components (simple molded parts) and also assembly (simple arrangement). Therefore, the radial assembly space can be kept small, especially because the first activation piston is arranged adjacent in the axial direction to the second of the two clutches. If the axial assembly space is kept as small as possible, then a solution more in line with DE19833376 A1 presents itself, for which the activation piston is arranged in the radial direction within the plate packets of the two clutches. However, deviating from the embodiment described there, it is to be preferred that the first activation piston for the first clutch is arranged on the other side in the axial direction. This means that for the case in which the first clutch is arranged on the right from the second clutch, the activation piston of the first clutch is located on the left of the activation piston of the second clutch. Consequently, an assembly space that is minimized in the axial direction can be obtained when the first activation piston is arranged within the plate packet of the second clutch and the second activation piston is arranged within the plate packet of the first clutch.

In a configuration of a wet-running plate clutch, a first compensation chamber for compensating centrifugal force for the first activation piston is provided, with this chamber being formed by a driving clutch bell and the first activation piston. Here, the clutch bell can be embodied as a clutch bell in the conventional sense: generally surrounding the entire double clutch like a housing. However, it is also possible to embody this part merely as a cover-like flange part, as will be explained in detail.

Furthermore, there can be a second compensation chamber for compensating centrifugal force for a second activation piston that can be activated hydraulically for activating the other clutch via a second compression chamber. This compensation chamber formed by a hub cylinder and the second activation piston.

The latter two variants can result in shifting of the two clutches of the double clutch being realized with defined counter force even at high rpm. In the effort to optimize the ratio of the axial assembly length and the radial assembly length of the entire clutch system, according to the invention, the clutch bell, the first activation piston, an outer plate support flange of the outer plate support, the second activation piston, and the hub cylinder are placed in a nested arrangement.

A clutch system with minimal diameter can be obtained when the clutch bell generally covers the activation piston like a pot, when simultaneously the first activation piston covers the outer plate support flange like a pot, when simultaneously the outer plate support flange in turn covers the second activation piston like a pot, and when finally, the second activation piston simultaneously covers the hub cylinder like a pot. An optimization to the shortest possible axial length can be obtained when the hub cylinder generally covers the second activation piston like a pot, when the second activation piston covers the outer plate support flange like a pot, when the outer plate support flange covers the first activation piston like a pot, and when the first activation piston covers the clutch bell like a pot.

An optimization of the double clutch in terms of minimized parasitic forces can be obtained when the first activation piston and the associated first compression chamber are arranged in the radial region between the outer contours of the tension sleeve and the outer contours of the inner plate support. In this way, the (axial) forces of the first activation piston are guided directly, which overall can lead to small deformations in the activation device, especially the tension sleeve, the activation piston, and the tension sleeve cover.

Furthermore, a restoring element or elements, e.g., a disk spring, is or are assigned to the first activation piston and/or to the second activation piston. By means of these restoring elements, the corresponding activation pistons are brought into defined positions, such as in the non-hydraulic fluid pressurized state.

DETAILED DESCRIPTION

Figure 1:
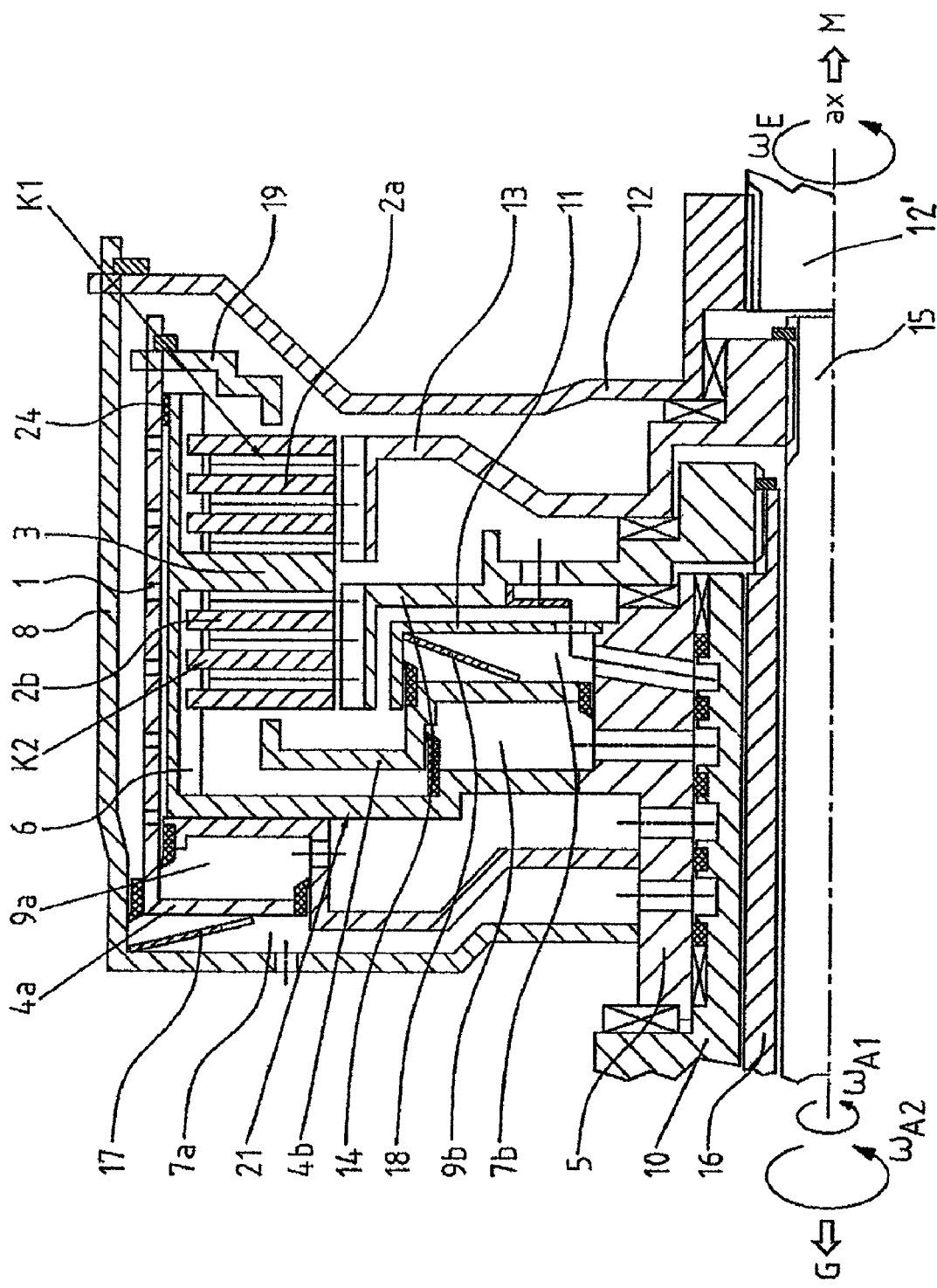
FIG. 1 is a cross-section view of a portion of a first embodiment of a double clutch in axial half section having shortened force paths and driven from the outside.

With reference to a cut-out from a powertrain for a motor vehicle selected as an example, FIG. 1 illustrates a possible basic setup and the function of a double clutch equipped according to the invention. On the right side of the figure, a crankshaft 12' can be connected to a clutch bell flange 12, e.g., by means of an intermeshing connection. The crankshaft is coupled, e.g., to an internal combustion engine, a motor, or the like. This side represents the drive side of the powertrain. On the left side of the figure, two transmission input shafts, namely a central or full shaft 15 and a hollow shaft 16, can be seen, which are led out from the clutch bell 8 of the double clutch and coupled, e.g., to a transmission or the like not shown here. This side represents the driven side of the powertrain.

Thus, e.g., the first transmission input shaft (central or full shaft 15) can be used for operating all of the odd gears (e.g., 1, 3, 5, . . . ) and the second transmission input shaft (hollow shaft 16) can be used for operating all of the even gears (e.g., 2, 4, 6, . . . ) of the motor vehicle. The reverse gear could be assigned to either the first transmission input shaft (central or full shaft 15) or else the second transmission input shaft (hollow shaft 16) of the transmission.

The double clutch itself comprises two single clutches K1 and K2. Each clutch K1, K2 comprises one inner plate support 13, 14. Both clutches K1, K2 share a common outer plate support 6. The inner plate support of the first clutch K1 is designated in the following as the first inner plate support 13 and the inner plate support of the second clutch K2 is designated in the following as the second inner plate support 14. The first inner plate support 13 is connected without rotational play via an intermeshing connection to the full shaft 15. The second inner plate support 14 is connected to the hollow shaft 16 via an intermeshing connection. The common outer plate support 6 is connected without rotational play to a clutch hub 5 that can rotate about a rotationally fixed clutch support 10. This clutch hub 5 is connected in turn without rotational play to a clutch bell 8 surrounding the two clutches K1, K2 like a housing, which in turn is connected without rotational play by means of a claw connection to the previously mentioned clutch bell flange 12, and thus to the drive.

The two inner plate supports 13, 14 have half-shell shapes and are arranged one next to the other in the axial direction. The outer plate support 6 has an essentially cylindrical shape and extends over the axial regions of the half shells 13, 14. The two inner plate supports 13, 14 have external toothed sections, which are used for guidance of friction plates each having three corresponding internal toothed sections in the present case so that they can move in the axial direction but are essentially fixed in terms of rotation. The friction plates are also typically designated as inner plates.

In a corresponding way, inner toothed sections are arranged on the inner periphery of the outer plate support sections of the common outer plate support 6 assigned to each inner plate support 13, 14. In these inner toothed sections, steel plates, the so-called outer plates, which have outer toothed sections, are guided so that they can move in the axial direction but are rotationally fixed. The two outer plate support sections are separated from each other by a common back plate 3. On the two outer ends of the common outer plate support 6, pressure plates are guided in the same way as the previously mentioned outer plates so that they can move in the axial direction but are essentially rotationally fixed.

The outer steel plates/outer plates, the inner friction plates/inner plates, as well as the two pressure plates and the common back plate alternately engage a plate packet assigned to a clutch K1, K2 like teeth in a known way. The two plate packets with the corresponding steel/friction plates are thus arranged on the common outer plate support 6 one behind the other in the axial direction. In the present embodiment, the friction surfaces of all friction plates are essentially the same size, so that the individual clutches K1, K2 exhibit equal efficiency. It is also possible for the friction surfaces of the friction plates to have different diameter sizes.

An activation piston 4a, 4b that can be activated hydraulically is assigned to each clutch K1, K2. Each of these activation pistons 4a, 4b is provided for generating activation forces for activating the corresponding clutches K1, K2. This means that starting from the corresponding force-generating activation piston 4a, 4b, corresponding pressure elements are pressed against the corresponding plate of the two pressure plates, which press the associated plate packet against the common back plate forming a friction fit between the adjacent steel/friction plates. Here, the two clutches K1, K2 are activated inwardly, with the reaction forces acting against the common back plate 3.

A tension sleeve 1 surrounds the outer plate support 6 on the outside, which transfers tensile forces, and which presses via a tension sleeve cover 19 the "outer" plate packet 2a together for coupling. The plate packets 2a, 2b are arranged so that they can use a common back plate 3. The axial activation forces act against each other and are supported against the common back plate 3. The activation piston 4a is arranged on the outside in the radial direction for the clutch K1 and thus the forces of the activation piston 4a are guided very directly, which leads to overall small deformations in the activation device. This piston 4a has centrifugal force compensation by a compensation chamber 7a, which is formed by the clutch bell 8 and the activation piston 4a itself. The second clutch K2 is activated by the second activation piston 4b, which has on its side centrifugal compensation. The compensation chamber 7b is formed by the piston 4b and a hub cylinder 11. The double clutch shown in FIG. 1 is driven on the side of the motor via the clutch bell flange 12. The power take-off to the transmission shafts 15 and 16 is realized via the inner plate supports 13 and 14. Both clutches K1, K2 have restoring elements 17, 18, which here are formed, e.g., as disk springs.

Figure 2:
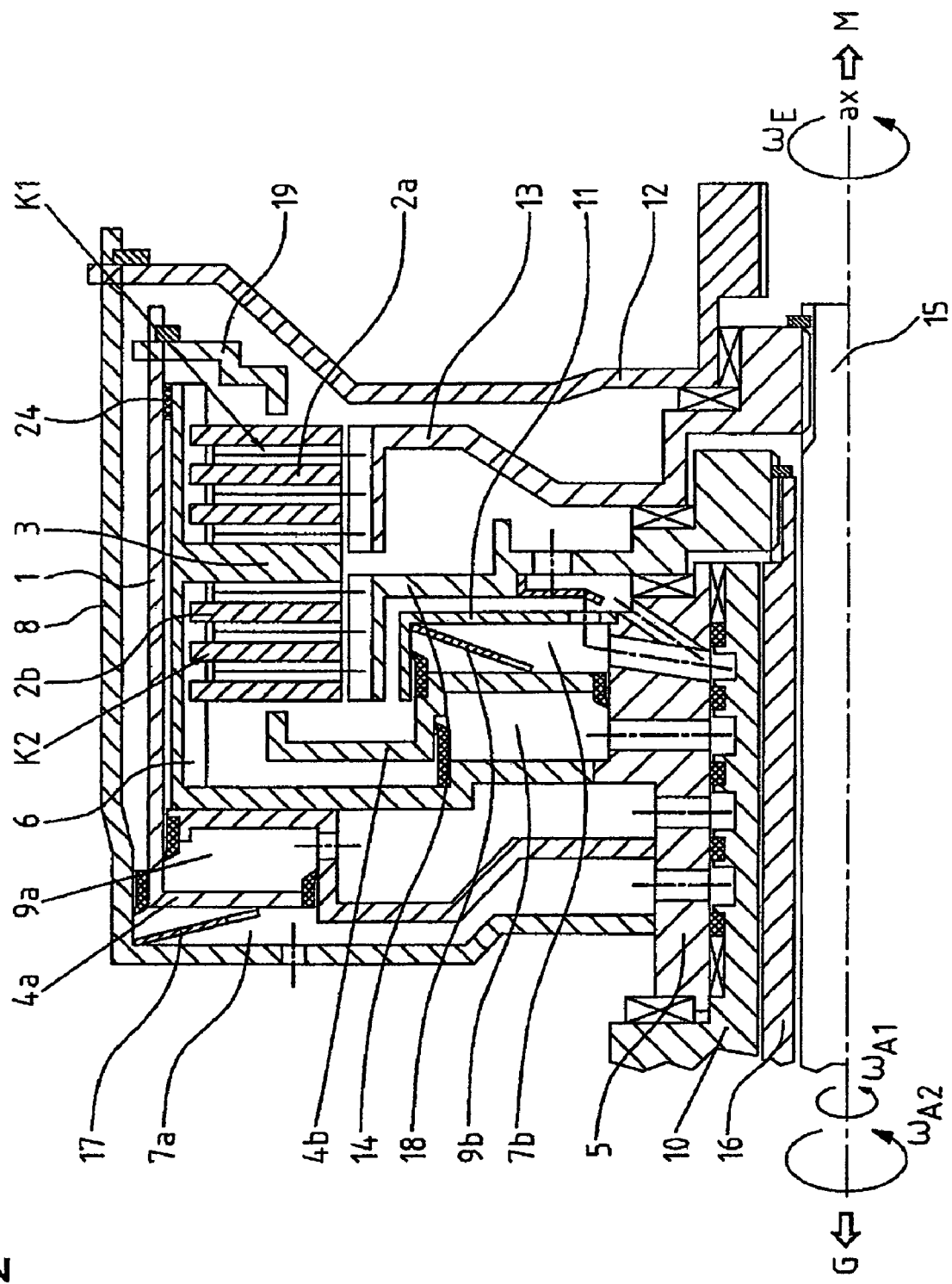
FIG. 2 is a cross-section view of a second embodiment of a double clutch in axial half section having shortened force paths, driven from the outside, and modified oil guidance.

FIG. 2 shows a second variant of a double clutch according to the invention. The essential components of this double clutch are generally identical to the double clutch according to FIG. 1. To simplify comparison, generally identical components are provided with the same reference symbols. The variant shown in FIG. 2 differs from that according to FIG. 1 by having a modified coolant guidance within the clutch device. With this variant, improved coolant supply to the first clutch K1 can be achieved.

Figure 3:
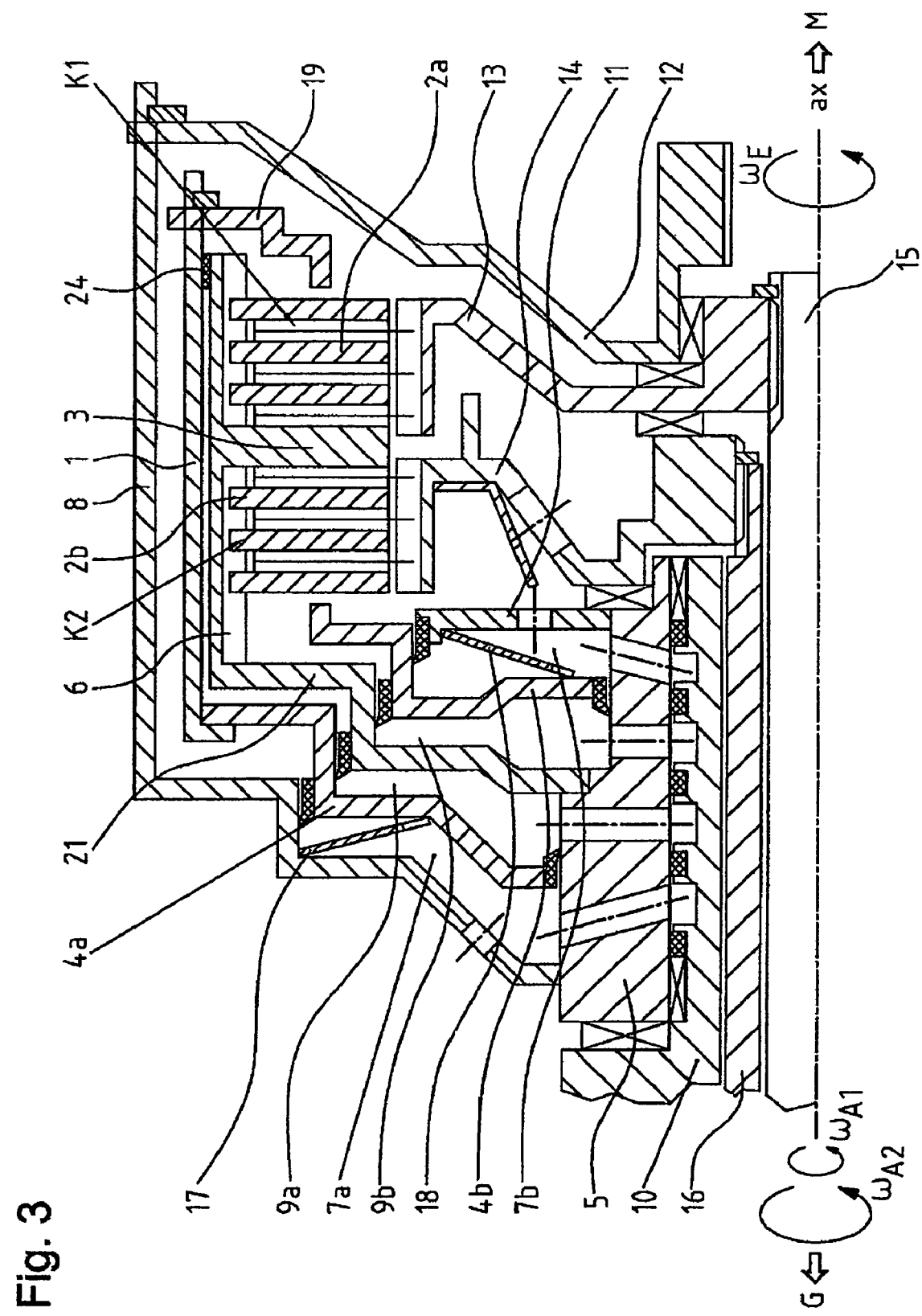
FIG. 3 is a cross-section view of a third embodiment a third embodiment of a double clutch in axial half section having minimal radial dimensions and driven from the outside.

A third variant of a double clutch according to the invention is shown in FIG. 3. The essential components of this double clutch are also identical to the double clutch according to FIG. 1. To simplify comparison, identical components are provided with the same reference symbols. The diameter of the clutch system is minimized. At a given system pressure the pistons 4a, 4b cannot be arbitrarily small, thus, they are staggered one behind the other in the axial direction, with the flange 21 of the outer plate support 6 coming to lie between the two pressure chambers 9a, 9b. To prevent wobble in the tension sleeve 1, this is supported on the outer end with a suitable (sliding) bearing element 24 against the outer plate support 6.

Figure 4:
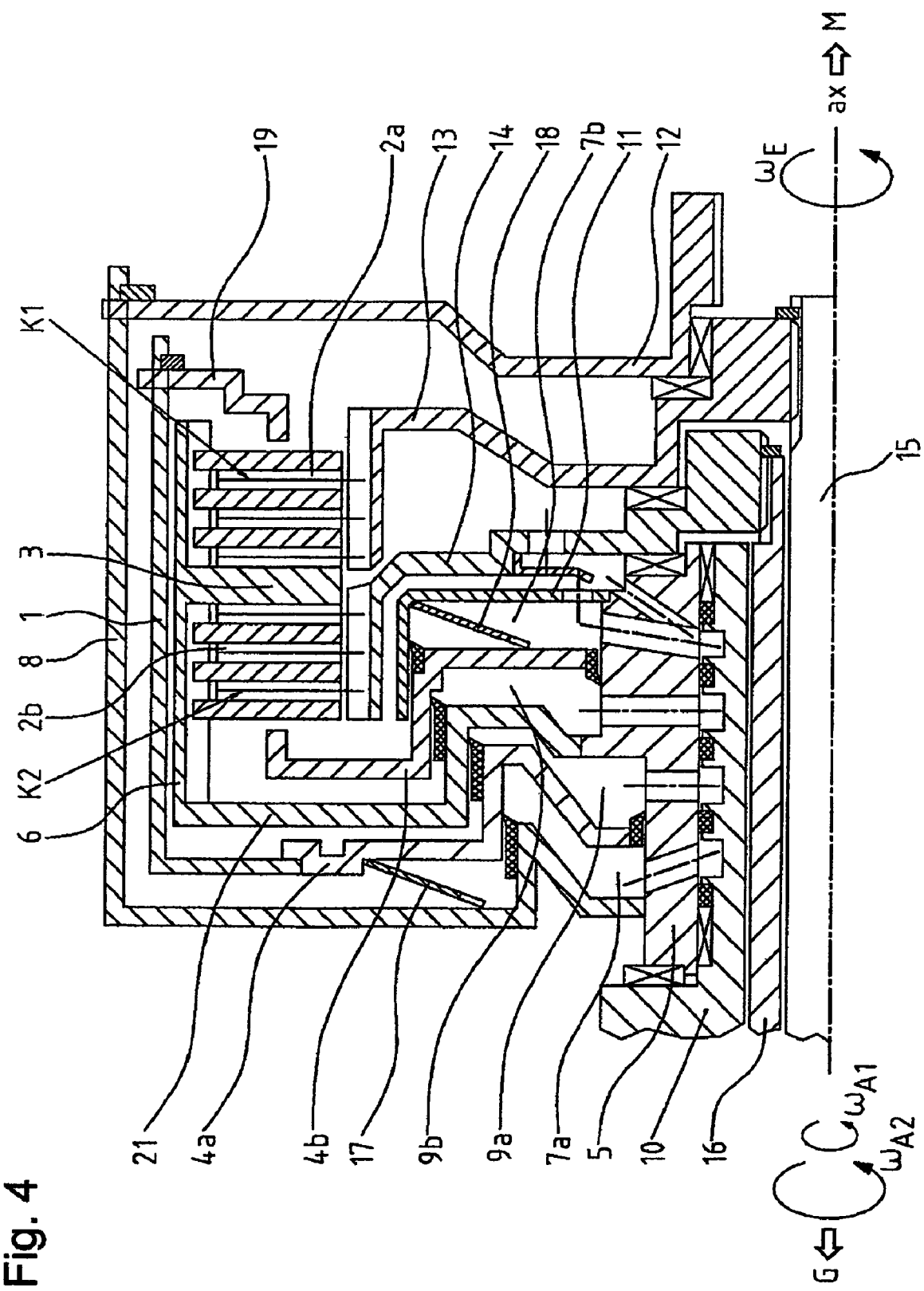
FIG. 4 is a cross-section view of a fourth embodiment of a double clutch in axial half section having minimal axial dimensions and driven from the outside.

FIG. 4 represents another variant, in which the components of the hydraulic activation are minimized in terms of axial structure length. The essential components of this double clutch are also generally identical to the double clutch according to FIG. 1. To simplify comparison, generally identical components are provided with the same reference symbols. The pistons 4a, 4b are arranged nested within the inner plate support 14 for reducing the axial structure space.

Figure 5:
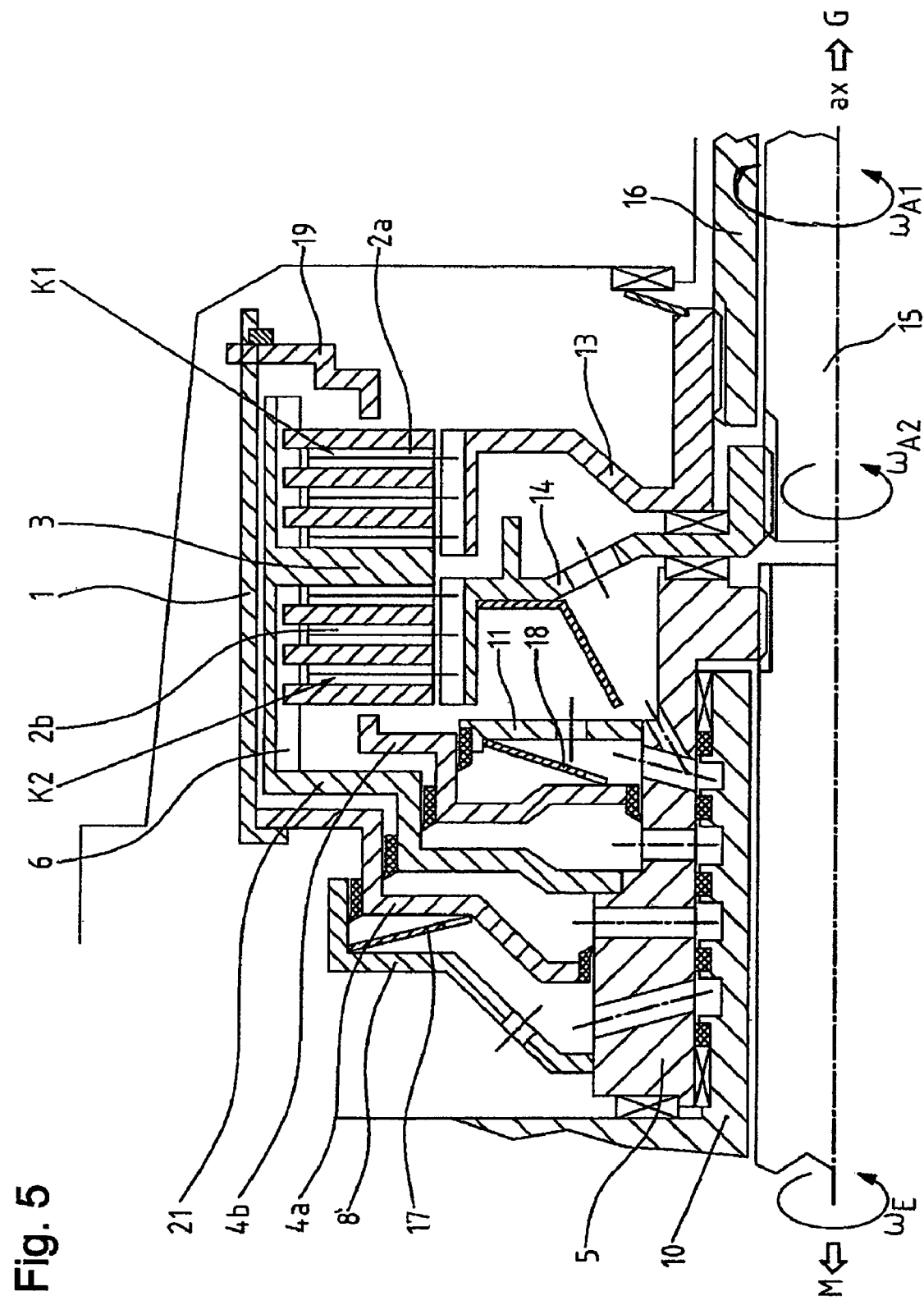
FIG. 5 is a cross-section view of a fifth embodiment of a double clutch in axial half section having minimal radial dimensions and driven from the inside.

FIG. 5 represents another variant. The essential components of this double clutch are also generally identical to the double clutch according to FIG. 1. To simplify comparison, generally identical components are provided with the same reference symbols. This variant is a modification of the variant from FIG. 3, with the drive being realized from inside out. Here, because no radially nested hollow shafts are required within the oil guidance, this configuration can be embodied in principle with an especially small system diameter.

Figure 6:
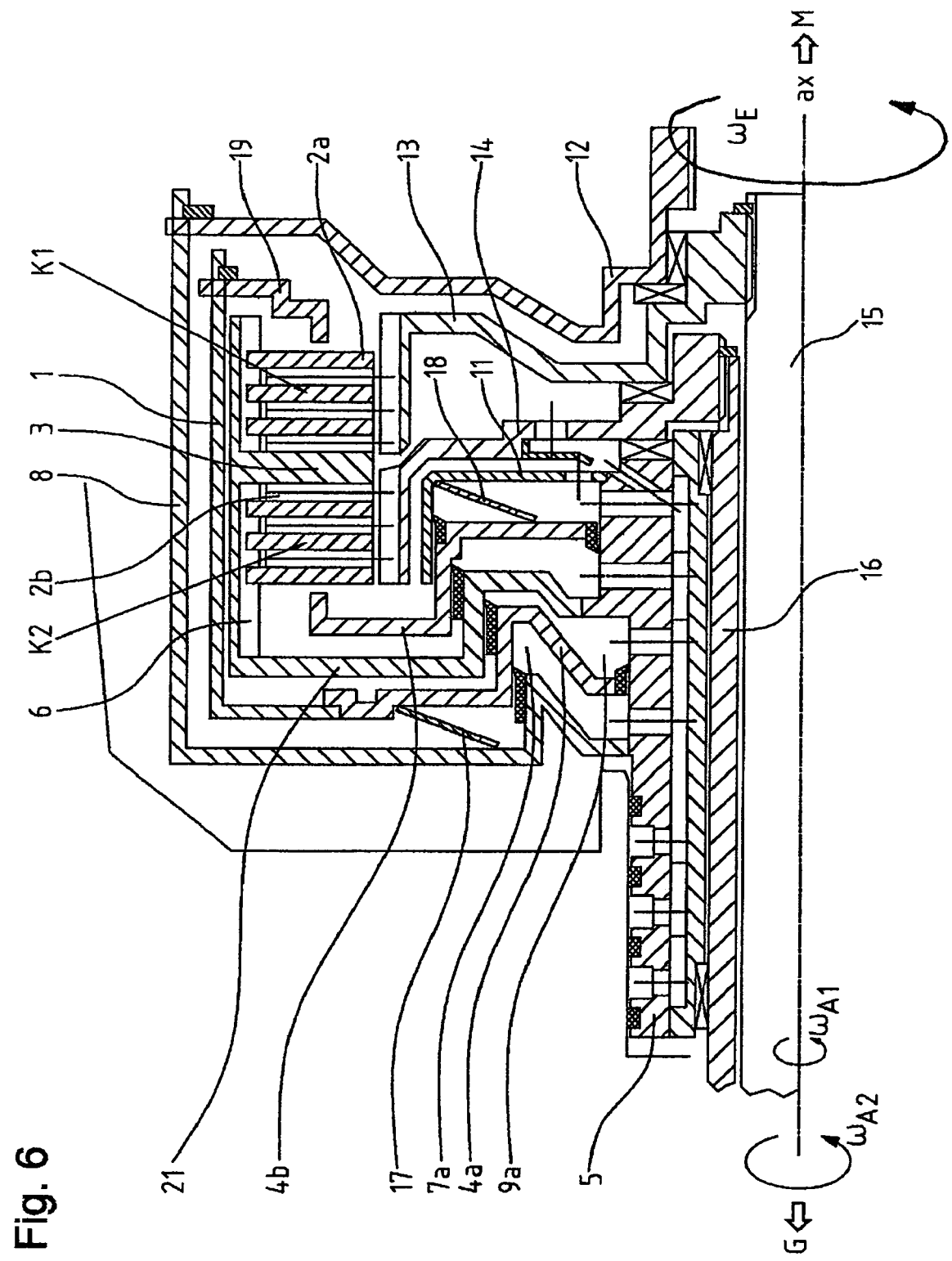
FIG. 6 is a cross-section view of a sixth embodiment of a double clutch in axial half section having minimal axial dimensions, driven from the outside and modified oil guidance.

The illustrated configurations until now relate to a standing support, in which the oil guidance is realized via a clutch support 10 connected to the transmission housing. It is also possible to embody this clutch with rotating oil guidance, as illustrated in FIG. 6. The essential components of this double clutch are also generally identical to the double clutch according to FIG. 1. To simplify comparison, generally identical components are provided with the same reference symbols.

The previously described variants advantageously result in stability relative to rpm, reduced diameters and reduced structure length. More specifically, the circumferential stresses due to the inherent weight of a thin sleeve depend on the square of the radius and rpm according to the formula $\sigma = \rho \cdot r^2 \cdot \omega^2$, where $\rho$ stands for the density of the material, $r$ the average radius, and $\omega$ the angular velocity. In a double clutch, the highest rpm values occur at the driven shafts, which can reach rpm values that are above the motor rpm. The inner driven double clutch has the advantage that these high rpm values occur at the inner plate supports that are smaller in diameter. According to the above formula, correspondingly higher rpm values can be experienced with a component of smaller radius, even if the kind of plate support remains the same. The tension sleeve can be configured as a sheet part with thinner wall thickness, because tensile stresses have an effect from the tensile force itself as well as the superimposed circumferential stress due to centrifugal force effects.

The double clutch can be built with a relatively small diameter, because the activation devices can be arranged on one side and only the plate diameter has an influence on the diameter (cf. FIG. 3).

On the other hand, it is also possible to optimize this concept in terms of short structure length, with the activation devices being located, at least partially, within the plates in the radial direction. Here, the other activation device can also be provided on the outside approximately at the radius of the plates (FIG. 1, FIG. 4). From the foregoing, it will be appreciated that double clutches are described herein which are both easy to assemble and permit simplified synchronization of the motor vehicle gears. While the figures are illustrative of certain aspects of double clutches, the double clutches are not limited to the aspects illustrated in the figures.

The invention claimed is:

1. A double clutch for a transmission, comprising:
   an input shaft;
   a pair of transmission output shafts each associated with one of a first clutch and a second clutch, the first and second clutches being rotatable about a common rotational axis and arranged one behind the other in the axial direction;
   a common outer plate support for each of the two clutches;
   a tension sleeve generally adjacent the common outer plate support for selectively activating the first clutch to permit the input shaft to drive the one of the pair of transmission output shafts associated with the first clutch;
   a hydraulically-actuated piston for selectively activating the second clutch to permit the input shaft to drive the one of the pair of transmission output shafts associated with the second clutch;
   a pressure apply chamber associated with the piston for applying hydraulic pressure to shift the piston to activate the second clutch and a second clutch compensation chamber for compensating centrifugal force for the piston; and
   a piston portion of the tension sleeve and a pressure apply chamber associated with the piston portion of the tension sleeve for applying hydraulic pressure to shift the piston portion of the tension sleeve and the tension sleeve to activate the first clutch, and a first clutch compensation chamber for compensating centrifugal force for the piston portion of the tension sleeve.

2. A double clutch according to claim 1, wherein the tension sleeve is generally coextensive with the axial length of the outer plate support.

3. A double clutch according to claim 2, wherein the tension sleeve is generally complementary to the outer contour of the outer plate support.

4. A double clutch according to claim 1, wherein the tension sleeve has fluid passages extending generally in the radial direction.

5. A double clutch according to claim 1, wherein the tension sleeve is supported on the outer plate support so that it can move in the axial direction.

6. A double clutch according to claim 1, wherein the tension sleeve transfers tensile force for activating the first clutch.

7. A double clutch according to claim 6, wherein the outer plate support is generally disposed between the tension sleeve and the first and second clutches, the tension sleeve is supported so that it can move in the axial direction relative to the outer plate support, and the tension sleeve is generally coextensive with the axial length of the outer plate support.

8. A double clutch according to claim 7, wherein the tension sleeve generally surrounds the outer plate support.

9. A double clutch according to claim 6, wherein a tension sleeve cover is stop-limited at least in the direction of the rotational axis in order to bring plates of the first clutch into frictional engagement.

10. A double clutch according to claim 1, wherein the piston is stop-limited at least in one direction of the rotational axis and is arranged adjacent to the second clutch in the axial direction.

11. A double clutch according to claim 1, wherein the second clutch compensation chamber is formed at least in part by a driving clutch bell and the piston.

12. A double clutch according to claim 1, wherein the pressure apply chamber associated with the piston portion of the tension sleeve is formed at least in part by a hub cylinder and the piston portion associated with the first clutch, and the clutch bell, the piston associated with the second clutch, an outer plate support flange of the outer plate support, the piston portion associated with the first clutch, and the hub cylinder are arranged generally staggered.

13. A double clutch according to claim 12, wherein the clutch bell generally covers the first activation piston, the piston associated with the second clutch generally covers the outer plate carrier flange, the outer plate support flange generally covers the piston portion associated with the first clutch, and the piston portion associated with the first clutch generally covers the hub cylinder.

14. A double clutch according to claim 12, wherein the hub cylinder generally covers the piston portion associated with the first clutch, the piston portion generally covers the outer plate support flange, the outer plate support flange generally covers the piston associated with the second clutch, and the piston associated with the second clutch generally covers the clutch bell.

15. A double clutch according to claim 1, wherein at least one restoring element biases the piston associated with the second clutch to a position where the second clutch is not activated.

16. A double clutch according to claim 1, wherein at least one restoring element biases the piston portion associated with the first clutch to a position where the first clutch is not activated.

17. A double clutch according to claim 1, wherein the piston and the pressure apply chamber associated with the piston are arranged in a radial region between the outer contours of the tension sleeve and the outer contours of an inner plate support.

18. A double clutch for a transmission, comprising:
   an input shaft;
   a pair of transmission output shafts each associated with one of a first clutch and a second clutch, the first and second clutches being rotatable about a common rotational axis and arranged one behind the other in the axial direction;
   a common outer plate support for each of the two clutches;
   a tension sleeve generally adjacent the common outer plate support for selectively activating the first clutch to permit the input shaft to drive the one of the pair of transmission output shafts associated with the first clutch;

a hydraulically-actuated piston for selectively activating the second clutch to permit the input shaft to drive the one of the pair of transmission output shafts associated with the second clutch;

a pressure apply chamber associated with the piston for applying hydraulic pressure to shift the piston to activate the second clutch and a second clutch compensation chamber for compensating centrifugal force for the piston; and wherein the piston associated with the second clutch and the associated pressure apply chamber are arranged in a radial region between outer contours of the tension sleeve and outer contours of an inner plate support.

19. A dual clutch mechanism, comprising;

an input shaft adapted for rotation about a longitudinal axis;

a first clutch arrangement coaxial with the axis of the input shaft, having a driving portion and a driven portion, the first clutch arrangement having at least one first driving plate operably connected to the driving portion and at least one first driven plate operably connected to the driven portion;

a second clutch arrangement coaxial with the axis of the input shaft having a driving portion and a driven portion, the second clutch arrangement having at least one second driving plate operably connected to the driving portion and at least one second driven plate operatively connected to the driven portion;

a common driving plate support operably connected to the input shaft supporting the first and second driving plates;

the first driven portion having a first driven plate support, and a hollow outer output shaft operably connected to the first driven portion for rotation therewith about a clutch longitudinal axis;

the second driven portion having a second driven portion support, and an inner output shaft positioned within the outer output shaft and adapted for rotation independent thereof, the inner output shaft operably connected to the second clutch driven portion for rotation therewith about the clutch longitudinal axis;

a piston shiftable to selectively engage the driving portion and driven portion of one of the first and second clutch arrangements to allow the input shaft to drive one of the inner and outer output shafts for rotation, a pressure apply chamber associated with the piston for applying hydraulic pressure to shift the piston to engage the driving portion and driven portion of the one of the first and second clutch arrangements and a compensation chamber for compensating centrifugal force for the piston;

a tension sleeve radially spaced from the common driving plate support generally surrounding the first and second clutch arrangements, the tension sleeve shiftable to selectively engage the driving portion and driven portion of the other of the first and second clutch arrangements to drive the other of the inner and outer output shafts for rotation, the tension sleeve having a piston portion and a pressure apply chamber associated with the piston portion of the tension sleeve for applying hydraulic pressure to shift the piston portion of the tension sleeve and the tension sleeve to engage the driving portion and the driven portion of the other of the first and second clutch arrangements, and a first clutch compensation chamber for compensating centrifugal force for the piston portion of the tension sleeve; and the circumferential stress at the driving plate support $\sigma_1$, the first driven plate support $\sigma_2$ and the second driven plate support $\sigma_3$ is described by the formula $\sigma=\rho(r^2)(\omega^2)$; where $\rho$ is the density of the support, r is the radial distance from the clutch longitudinal axis to the plate support and $\omega$ is the angular velocity of the plate support; and the radial distance $r_1$ for the driving plate support, the radial distances $r_2$ and $r_3$ for the first and second driven disk supports, and $\rho_1$ for the driving plate support, and $\rho_2$ and $\rho_3$ for the first and second driven plate supports are selected such that $\sigma_2<\sigma_1$ and $\sigma_3<\sigma_1$ at a given input shaft rotational speed.

20. A dual clutch mechanism in accordance with claim 19, wherein the input shaft operates over a range of rotational speeds, and $r_1$, $r_2$ and $r_3$, and $\rho_1$, $\rho_2$ and $\rho_2$ are selected such that $\sigma_2<\sigma_1$ and $\sigma_3<\sigma_1$ over the majority of the input shaft speeds.

21. A double clutch for a transmission, comprising:

an input shaft;

a pair of transmission output shafts each associated with one of a first clutch and a second clutch, the first and second clutches being rotatable about a common rotational axis and arranged one behind the other in the axial direction;

a common outer plate support for each of the two clutches;

a tension sleeve generally adjacent the common outer plate support for selectively activating the first clutch to permit the input shaft to drive the one of the pair of transmission output shafts associated with the first clutch, the tension sleeve having fluid passages extending generally in the radial direction.

22. A double clutch for a transmission, comprising:

an input shaft;

a pair of transmission output shafts each associated with one of a first clutch and a second clutch, the first and second clutches being rotatable about a common rotational axis and arranged one behind the other in the axial direction;

a common outer plate support for each of the two clutches;

a tension sleeve generally adjacent the common outer plate support for selectively activating the first clutch to permit the input shaft to drive the one of the pair of transmission output shafts associated with the first clutch;

a clutch hub for driving the common outer plate for rotation; and a clutch bell driven for rotation via the input shaft and driving the clutch hub for rotation, the clutch bell having a segment positioned radially outward relative to the tension sleeve.

* * * * *